United States Patent
Wang et al.

(10) Patent No.: US 9,778,024 B2
(45) Date of Patent: Oct. 3, 2017

(54) TARGET MATERIAL THICKNESS MEASURING APPARATUS

(71) Applicants: BOE Technology Group Co., Ltd., Beijing (CN); Hefei Xinsheng Optoelectronics Technology Co., Ltd., Anhui (CN)

(72) Inventors: Deyong Wang, Beijing (CN); Yefa Li, Beijing (CN); Liang Peng, Beijing (CN); Congqi Zheng, Beijing (CN); Daeyoung Choi, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 14/913,163

(22) PCT Filed: Jul. 28, 2015

(86) PCT No.: PCT/CN2015/085296
§ 371 (c)(1),
(2) Date: Feb. 19, 2016

(87) PCT Pub. No.: WO2016/123934
PCT Pub. Date: Aug. 11, 2016

(65) Prior Publication Data
US 2016/0349037 A1 Dec. 1, 2016

(30) Foreign Application Priority Data
Feb. 5, 2015 (CN) .......................... 2015 1 0061271

(51) Int. Cl.
*G01B 11/28* (2006.01)
*G01B 11/06* (2006.01)
(Continued)

(52) U.S. Cl.
CPC .............. *G01B 11/06* (2013.01); *G01B 5/061* (2013.01); *G01B 5/207* (2013.01); *G01B 11/0608* (2013.01); *G01B 2210/42* (2013.01)

(58) Field of Classification Search
CPC ................ G01B 11/06; G01B 11/0608; G01B 2210/42; G01B 5/06; G01B 5/061; G01B 5/207
(Continued)

(56) References Cited

U.S. PATENT DOCUMENTS 6,378,221 B1 * 4/2002 Ekholm, Jr. ........... G01B 5/207 33/121

FOREIGN PATENT DOCUMENTS

CN 1070306 A 3/1993
CN 101158566 A 4/2008
(Continued)

OTHER PUBLICATIONS

First Office Action, including Search Report, for Chinese Patent Application No. 201510061271.2, dated Dec. 21, 2016, 12 pages.
(Continued)

*Primary Examiner* — Tri T Ton
(74) *Attorney, Agent, or Firm* — Westman, Champlin & Koehler, P.A.

(57) ABSTRACT

Embodiments of the present invention disclose a target material thickness measuring apparatus including: a support; and a plurality of distance measuring units mounted on the support and arranged in a first direction, the plurality of distance measuring units being configured to respectively measure thicknesses of portions of a target material at a plurality of positions in the first direction. A plurality of thickness values of different portions of the target material along a straight line can be obtained at one time, for example, by performing a single measurement of thicknesses of the portions of the target material at the plurality (Continued)

of positions by means of the plurality of distance measuring units, thereby improving measurement efficiency.

19 Claims, 3 Drawing Sheets

(51) Int. Cl.
  *G01B 5/06* (2006.01)
  *G01B 5/207* (2006.01)
(58) Field of Classification Search
  USPC .................................................. 356/625–640
  See application file for complete search history.

(56) References Cited

FOREIGN PATENT DOCUMENTS

| CN | 201059933 Y | 5/2008 |
|----|----|----|
| CN | 101776448 A | 7/2010 |
| CN | 101776448 B | 3/2012 |
| CN | 103398664 A | 11/2013 |
| CN | 103644836 A | 3/2014 |
| CN | 204142145 U | 2/2015 |
| CN | 104613844 A | 5/2015 |
| GB | 2 217 835 A | 11/1989 |
| JP | 5-69121 A | 3/1993 |
| JP | 2005-265792 A | 9/2005 |

OTHER PUBLICATIONS

International Search Report and Written Opinion for International Patent Application No. PCT/CN2015/085296, dated Oct. 30, 2015, 10 pages.

English translation of Box No. V from the Written Opinion of the International Search Report for International Patent Application No. PCT/CN2015/085296, 2 pages.

Second Office Action from Chinese Patent Application No. 201510061271.2, dated May 31, 2017, 9 pages.

* cited by examiner

TARGET MATERIAL THICKNESS MEASURING APPARATUS

CROSS-REFERENCE TO RELATED APPLICATION

This application is a national phase application of international application PCT/CN2015/085296 filed on Jul. 28, 2015 and claims the benefit of Chinese Patent Application No. 201510061271.2 filed on Feb. 5, 2015 in the State Intellectual Property Office of China, the whole disclosure of which is incorporated herein by reference.

BACKGROUND

Technical Field

Embodiments of the present invention relate to a target material thickness measuring apparatus.

Description of the Related Art

Conventional target material thickness measuring instrument is used to measure a consumption amount or remaining amount of a target material used for sputtering.

SUMMARY

An object of embodiments of the present invention is to provide a target material thickness measuring apparatus, which is able to, for example, determine a consumption amount of a target material much more quickly and accurately.

According to an embodiment of the present invention, there is provided a target material thickness measuring apparatus, comprising: a support; and a plurality of distance measuring units mounted on the support and arranged in a first direction, the plurality of distance measuring units being configured to respectively measure thicknesses of portions of a target material at a plurality of positions in the first direction.

With the above-mentioned technical solution, a plurality of thickness values of different portions of the target material along a straight line can be obtained at one time, for example, by performing a single measurement of thicknesses of the portions on the target material at the plurality of positions by means of the plurality of distance measuring units, thereby improving measurement efficiency.

According to an embodiment of the present invention, each of the distance measuring units comprises a test probe which is movable in a second direction perpendicular to the first direction and also perpendicular to a surface of the target material, the test probe has a first end configured to contact the surface of the target material and an opposite second end; wherein, a thickness of the target material is measured by measuring a distance of movement of the test probe in the second direction.

With the above-mentioned technical solution, a plurality of thickness values of different portions of the target material along a straight line can be obtained with a simple arrangement in which a plurality of test probes are adopted. Thus, the target material thickness measuring apparatus has a high reliability and can perform convenient and efficient measurement.

According to an embodiment of the present invention, the target material thickness measuring apparatus further comprises a scale plate detachably mounted to the support and arranged adjacent to the test probe, wherein a surface of the scale plate facing towards the test probe has graduations, and, a position of the second end of the test probe in the second direction is determinable in accordance with the graduation of the scale plate.

With the above-mentioned technical solution, a plurality of thickness values of different portions of the target material along a straight line can be obtained visually, for example, by provision of the scale plate.

According to an embodiment of the present invention, the surface of the scale plate facing towards the test probe is substantially parallel to the first direction and the second direction.

With the above-mentioned technical solution, a plurality of thickness values of different portions of the target material along a straight line can be obtained in a much more accurate manner, for example.

According to an embodiment of the present invention, the target material thickness measuring apparatus further comprises a measurement value collection unit adapted for collecting measurement values at the plurality of positions, measured by the plurality of distance measuring units.

With the above-mentioned technical solution, measurement values from the plurality of distance measuring units can be collected by the measurement value collection unit at one time, for example, by performing a single measurement of thicknesses of the portions of the target material at the plurality of positions by means of the plurality of distance measuring units, thereby further improving measurement efficiency.

According to an embodiment of the present invention, the measurement value collection unit comprises an image acquisition device adapted for acquiring images of the second ends of the plurality of test probes; and the target material thickness measuring apparatus further comprises a processing unit adapted for processing the images acquired by the image acquisition device to obtain positions of the second ends of the plurality of test probes so as to derive the thickness of the target material.

With the above-mentioned technical solution, the positions of the second ends of the plurality of test probes can be obtained, for example, by collecting images of the second ends of the plurality of test probes by means of the image acquisition device, and by processing the images by means of the processing unit, so that a thickness distribution of the target material can be obtained. Thus, the target material thickness measuring apparatus has a high reliability and a great anti-noise capability, and can perform convenient and efficient measurement.

According to an embodiment of the present invention, each of the distance measuring units comprises a helical spring fitter over the test probe and adapted for exerting a force on the test probe towards the surface of the target material in the second direction, and, the helical springs provided on the adjacent test probes are in arranged in a staggered way in the second direction.

With the above-mentioned technical solution, the test probes can be arranged densely, so as to obtain a much denser arrangement of measuring points.

According to an embodiment of the present invention, the support is provided with a stopper, and one end of the helical spring is connected with the stopper while the other end of the helical spring is connected with the test probe, so that the helical spring can be easily fixed in position.

According to an embodiment of the present invention, the stopper is provided with a plurality of through holes configured so that the test probes pass therethrough respectively, so as to easily position and guide the test probes.

According to an embodiment of the present invention, the first end of the test probe is provided with a roller, such that the test probe is smoothly moveable on the surface of the target material.

According to an embodiment of the present invention, the measurement value collection unit is fixed on a bracket extending from the support, so as to easily hold relative positions between the measurement value collection unit and the support and to move the support together with measurement value collection unit.

According to an embodiment of the present invention, the target material thickness measuring apparatus further comprises a guiding device adapted for guiding the support to move in a third direction perpendicular to the first direction and the second direction.

With the above-mentioned technical solution, a surface profile of the entire surface of the target material or a thickness distribution of the entire target material can be obtained easily.

According to an embodiment of the present invention, the target material thickness measuring apparatus further comprises a bearing plate on which the target material is mounted; and the guiding device comprises a rail provided on the bearing plate and a slide assembly connected to the support and being movable on the rail.

According to an embodiment of the present invention, the image acquisition device is adapted for acquiring images of the graduations of the scale plate; and, the image processing unit is adapted for processing the acquired images of the graduations of the scale plate, so that position data of the graduations of the scale plate can be obtained as a reference of measurement. The scale plate can be detached after the images of graduations on the scale plate are obtained by the image acquisition device.

With the above-mentioned technical solution, the target material thickness measuring apparatus has a simpler structure and the cost of the target material thickness measuring apparatus may be reduced, for example, by detaching the scale plate after the images of graduations on the scale plate are obtained by the image acquisition device.

DETAILED DESCRIPTION OF THE EMBODIMENTS

Exemplary embodiments of the present invention will be described hereinafter with reference to the attached drawings.

Specific embodiments of the present invention will be described hereinafter in detail with reference to the attached drawings. In addition, in the following detailed description, for explanation purpose, many specific details will be illustrated to provide a complete understanding of the embodiments of the present disclosure. Obviously, however, one or more of the embodiments can be implemented without inclusion of these specific details. In other circumstances, well-known structures and devices will be presented schematically, in order to simplify the drawings.

Figure 1:
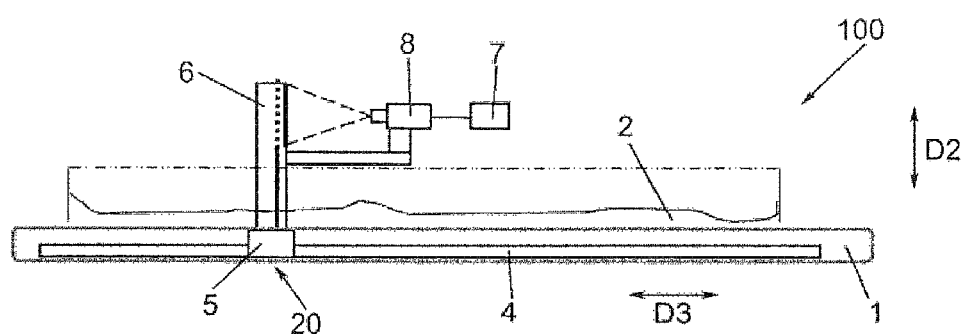
FIG. 1 is a schematic side view of a target material thickness measuring apparatus according to an embodiment of the present invention when measuring a thickness of a target material.
Figure 2:
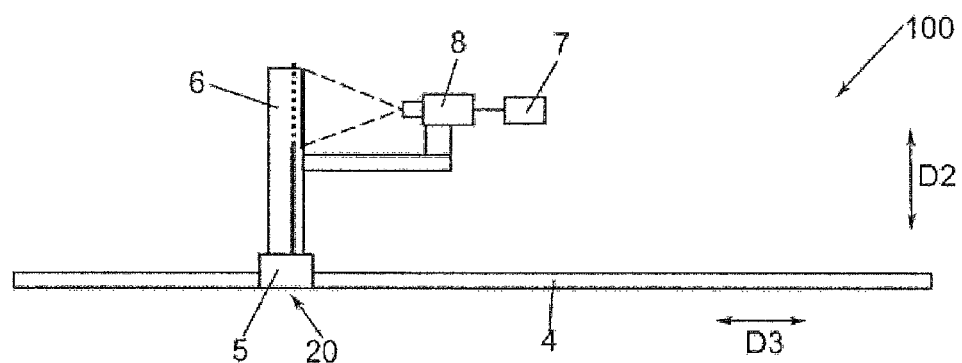
FIG. 2 is a schematic side view of a target material thickness measuring apparatus according to an embodiment of the present invention.
Figure 3:
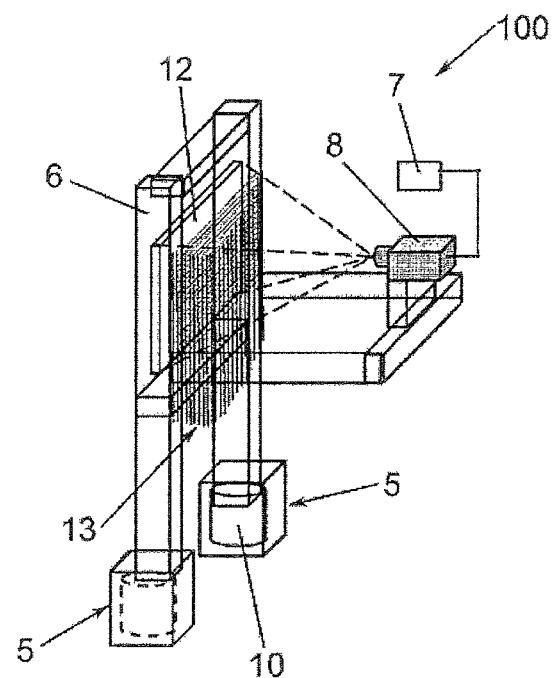
FIG. 3 is a schematic perspective view of some components of a target material thickness measuring apparatus according to an embodiment of the present invention.
Figure 4:
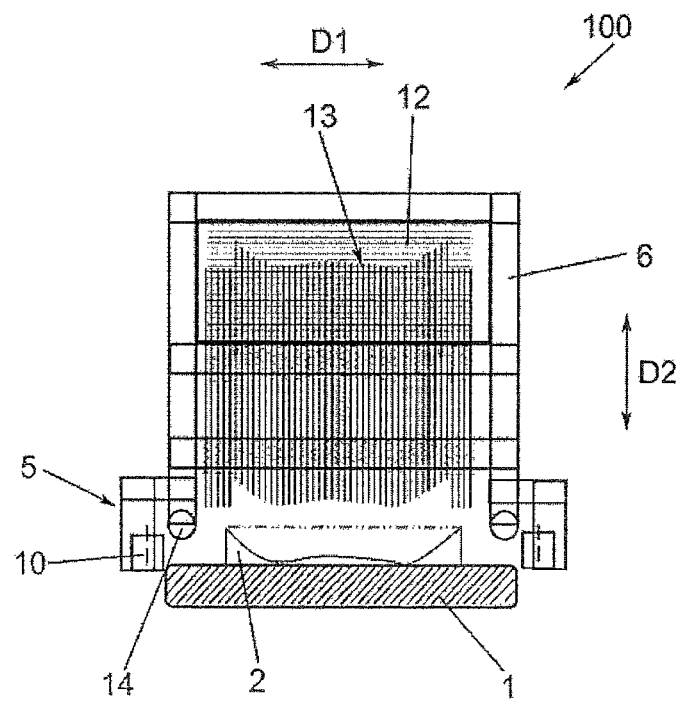
FIG. 4 is a front view of a target material thickness measuring apparatus according to an embodiment of the present invention, with some components omitted for clear purposes.

FIGS. 1 and 2 show a target material thickness measuring apparatus according to embodiments of the present invention, and FIGS. 3 and 4 show some components of the target material thickness measuring apparatus according to the embodiments of the present invention.

As shown in FIGS. 1 to 4, a target material thickness measuring apparatus 100 according to embodiments of the present invention comprises: a support 6; and a plurality of distance measuring units 13 mounted on the support 6 and arranged in a first direction D1, the plurality of distance measuring units 13 are configured to respectively measure thicknesses of portions of a target material 2 at a plurality of positions in the first direction D1. A plurality of thickness values of different portions of the target material 2 along a straight line can be obtained at one time, for example, by performing a single measurement of the thicknesses of the portions of the target material 2 at the plurality of positions by means of the plurality of distance measuring units 13, thereby improving efficiency of the measurement. The target material thickness measuring apparatus 100 further comprises a measurement value collection unit 8 adapted for collecting measurement values at the plurality of positions, measured by the plurality of distance measuring units 13. The target material 2 is mounted on a target material back plate (bearing plate) 1. The support 6 may be a frame. The plurality of thickness values of different positions of the target material 2 along the straight line can be obtained at one time, for example, by performing a single measurement of the thicknesses of the portions of the target material 2 at the plurality of positions by means of the plurality of distance measuring units 13, and collecting measurement values from the plurality of distance measuring units 13 by means of the measurement value collection unit at one time, thereby further improving efficiency of the measurement. In case that no measurement value collection unit 8 is provided, the thickness of the target material 2 may be estimated visually, or by means of visually reading corresponding data on a scale plate 12 which will be described later.

As shown in FIGS. 3 to 6, each of the distance measuring units 13 may comprise a test probe 15 which is movable in a second direction D2 perpendicular to the first direction D1 and also perpendicular to a surface of the target material, and the test probes 15 are arranged perpendicular to the surface of the target material, that is, arranged in the second direction. The test probe 15 has a first end configured to contact the surface of the target material 2 and an opposite second end. The thickness of the target material 2 is measured by measuring a distance of movement of the test probe in the second direction. Each of the distance measuring units 13 may further comprise a probe roller 17 which enables the probe 15 to smoothly move on the surface of the target material 2. The test probe 15 may be in a tight contact with the target material 2 through application of an external force such as elastic force, gravity force, magnetic force, or the like. The plurality of thickness values of the portions of the target material 2 along the straight line can be obtained with a simple arrangement in which a plurality of test probes 15 are adopted. Thus, the target material thickness measuring apparatus has a high reliability and can achieve convenient and efficient measurement.

Figure 5:
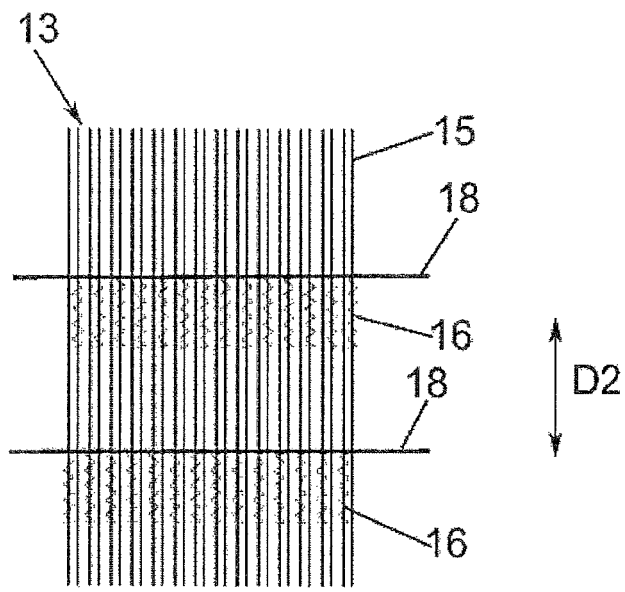
FIG. 5 is a schematic view of a distance measuring unit of a target material thickness measuring apparatus according to an embodiment of the present invention.
Figure 6:
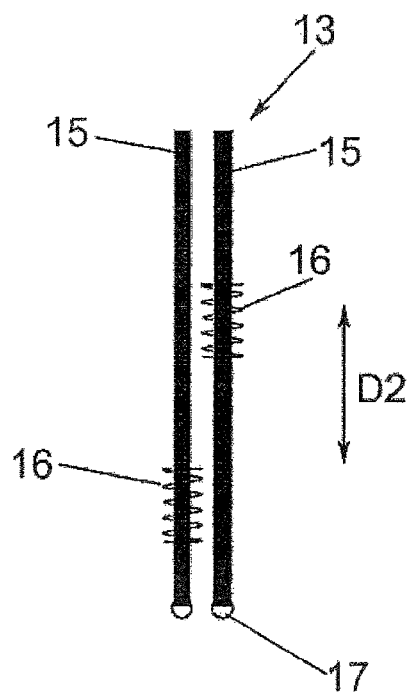
FIG. 6 is a structural schematic diagram of two adjacent distance measuring units of a target material thickness measuring apparatus according to an embodiment of the present invention.

As shown in FIGS. 3 to 6, each of the distance measuring units 13 may further comprise a helical spring 16 fitted over the test probe 15 and adapted for exerting a force on the test probe 15 towards the surface of the target material 2 in the second direction D2, and the helical springs 16 provided on adjacent test probes 15 are arranged in a staggered way in the second direction D2. Thereby, the test probes 15 can be arranged densely, for example, so as to obtain a much denser arrangement of measuring points. As shown in FIG. 5, an upper end of the helical spring 16 is connected with a stop member (stopper) 18 connected to the support 6 while a lower end of the helical spring 16 is connected with the test probe 15 so that the helical spring applies a force on the test probe 15. The stop member 18 may be provided with a plurality of through holes configured so that the test probes 15 can pass therethrough respectively, thereby the through holes of the stop member 18 will position and guide the test probes.

For example, as shown in FIG. 4, if a position where the test probe 15 is in contact with an upper surface of the target material back plate 1 in the second direction D2 is set as a reference position, a distance in the second direction D2 between a lower end of the test probe 15 and the upper surface of the target material back plate 1 (namely, a distance in the second direction D2 between a position of an upper/lower end of the test probe 15 when the test probe contacts the surface of the target material 2 and a position of the upper/lower end of the test probe 15 when the test probe is located at the reference position) is a thickness of the target material. And, if a position where the lower end of the test probe 15 is in contact with an upper surface of the initial or unused target material 2 is set as a reference position, a distance in the second direction D2 between a position of the upper/lower end of the test probe 15 when the test probe contacts a surface of the used target material 2 and a position of the upper/lower end of the test probe 15 when the test probe is located at the reference position is a consumption thickness of the target material, and an actual thickness of the target material may be obtained according to an initial thickness of the target material and the consumption thickness of the target material.

Alternatively, any other suitable component for distance measurement, for example, an electronic vernier caliper, an electric induction ranging unit, a distance measuring sensor or the like, can replace the test probe.

As shown in FIGS. 3 and 4, the target material thickness measuring apparatus 100 may further comprise: a scale plate 12 detachably mounted to the support 6 and arranged adjacent to the test probe 15, wherein a surface of the scale plate 12 facing towards the test probe 15 has graduations, and, a position of the second end of the test probe 15 in the second direction D2 is determinable in accordance with the graduation of the scale plate 12. By provision of the scale plate 12, a plurality of thickness values of different portions of the target material 2 along a straight line can be obtained visually, and corresponding data will be read visually. The surface of the scale plate 12 facing towards the test probe 15 can be substantially parallel to the first direction D1 and the second direction D2. As a result, a plurality of thickness values of different portions of the target material 2 along the straight line can be obtained in a much more accurate manner, for example.

As shown in FIGS. 1 to 3, the measurement value collection unit 8 can be an image acquisition device such as a camera. The image acquisition device is adapted for acquiring images of the second ends of the plurality of test probes 15. The measurement value collection unit 8, for example, is fixed on a bracket extending from the support 6 so as to move together with the support. further, the target material thickness measuring apparatus 100 may further comprise a processing unit 7 adapted for processing the images acquired by the image acquisition device to obtain positions of the second ends of the plurality of test probes 15, so as to derive the thickness of the target material 2. For example, the images of the second ends of the plurality of test probes 15 are acquired by the image acquisition device and processed by the processing unit 7, so that the positions of the second ends of the plurality of test probes 15 can be obtained, thereby obtaining a thickness distribution of the target material 2. Thus, the target material thickness measuring apparatus has a high reliability and a great anti-noise capability, and can perform convenient and efficient measurement.

As shown in FIGS. 1 to 4, according to an embodiment of the present invention, the target material thickness measuring apparatus 100 may further comprise a guiding device 20 adapted for guiding the support 6 to move in a third direction D3 perpendicular to the first direction D1 and the second direction D2. Thus, a surface profile of the entire surface of the target material 2 or a thickness distribution of the entire target material 2 can be obtained easily, for example, by allowing the support 6 to be movable due to provision of the guiding device 20. The guiding device 20 may comprise a rail 4 and a slide assembly 5 connected to the support 6 and being movable on the rail 4. The rail 4 may be provided on the back plate 1. The slide assembly 5 may comprises a first roller 10 which is configured to roll along two lateral surfaces of the rail 4 in the first direction D1. In addition, the slide assembly 5 may further comprise a second roller 14 configured to roll along a top surface of the rail 4.

The target material thickness measuring apparatus according to embodiments of the present invention is able to measure consumption amount of the target material 2 quickly, effectively, accurately and in batch, and can provide a surface profile of the entire target material 2 showing the consumption amount.

With the target material thickness measuring apparatus according to embodiments of the present invention, the plurality of test probe 15 are used so that, a consumption curve of the target material 2 at a certain position will can be shown visually during measurement of the consumption amount of the target material 2 at this position. The scale plate 12 is mounted at the rear of the test probe 15, so that data can be read visually and directly from the scale plate. In addition, the image acquisition device such as camera located in front of the test probes 15 can obtain a position curve (or images) of the second ends of the plurality of test probes 15 and corresponding images of the graduation lines on the scale plate 12. Corresponding data is obtained from the images by the image processing unit 7. The support 6 slides into a next testing position, then the above mentioned procedures are repeated again so that test data of the next point can be obtained quickly. The target material thickness measuring apparatus may comprises a device for measuring a position of the support 6 in the third direction D3 and a driving unit, such as a motor, for driving the support 6 to slide in the third direction D3.

According to some embodiments of the present invention, the image acquisition device can acquire images of graduations on the scale plate 12. The images of graduations on the scale plate are processed by the image processing unit 7 so that position data of the graduations on the scale plate 12 are obtained. The position data of the graduations on the scale plate 12 can be stored in a storage and serves as the measurement reference. After that, the scale plate 12 can be detached. During measurement, the image acquisition device can acquire curve and images of positions of the second ends of the plurality of test probes 15. Based on the stored position data of the graduations on the scale plate 12, corresponding position data of the second ends of the plurality of test probes 15 can be obtained by the image processing unit 7 from the curve or images of positions of the second ends of the plurality of test probes 15. The scale plate is detached after the images of the graduations on the scale plate are obtained by the image acquisition device. As a result, the target material thickness measuring apparatus has a simpler structure and the cost of the target material thickness measuring apparatus may be reduced.

With the target material thickness measuring apparatus according to embodiments of the present invention, the surface profile of the target material 2 is presented quickly and visually, which enables preliminary estimation of the thickness and accurate measurement of the thickness.

The above embodiments are only intended to illustrate the present invention and should not be construed as being limitative to the present invention. various changes and modifications may be also made by those skilled in the art without departing from principles and spirit of the present invention. All equivalents of the technical solutions in the embodiments fall into the scope of the present invention, and the scope of the present invention is defined in the claims.

What is claimed is:

1. A target material thickness measuring apparatus, comprising:
   a support; and
   a plurality of distance measuring units (13) mounted on the support and arranged in a first direction, the plurality of distance measuring units (13) being configured to measure respectively thicknesses of portions of a target material at a plurality of positions in the first direction,
   wherein each of the distance measuring units (13) comprises:
      a test probe (15) which is movable in a second direction perpendicular to the first direction and also perpendicular to a surface of the target material, the test probe (15) having a first end configured to contact the surface of the target material and an opposite second end; and
      a helical spring (16) fitted over the test probe (15) and adapted for exerting a force on the test probe (15) towards the surface of the target material in the second direction, and the helical springs (16) provided on the adjacent test probes (15) are arranged in a staggered way in the second direction.

2. The target material thickness measuring apparatus of claim 1, wherein:
   the thickness of the target material is measured by measuring a distance of movement of the test probe (15) in the second direction.

3. The target material thickness measuring apparatus of claim 2, further comprising:
   a scale plate detachably mounted to the support and arranged adjacent to the test probe, wherein a surface of the scale plate facing towards the test probe has graduations, and a position of the second end of the test probe in the second direction is determinable in accordance with the graduation of the scale plate.

4. The target material thickness measuring apparatus of claim 3, wherein:
   the surface of the scale plate facing towards the test probe is substantially parallel to the first direction and the second direction.

5. The target material thickness measuring apparatus of claim 1, further comprising:
   a measurement value collection unit adapted for collecting measurement values at the plurality of positions, measured by the plurality of distance measuring units.

6. The target material thickness measuring apparatus of claim 2, further comprising:
   a measurement value collection unit adapted for collecting measurement values at the plurality of positions, measured by the plurality of distance measuring units.

7. The target material thickness measuring apparatus of claim 6, wherein:
   the measurement value collection unit comprises an image acquisition device adapted for acquiring images of the second ends of the plurality of test probes; and
   the target material thickness measuring apparatus further comprises a processing unit adapted for processing the images acquired by the image acquisition device to obtain positions of the second ends of the plurality of test probes, so as to obtain the thickness of the target material.

8. The target material thickness measuring apparatus of claim 1, wherein:
   the support is provided with a stopper, and
   one end of the helical spring is connected with the stopper while the other end of the helical spring is connected with the test probe.

9. The target material thickness measuring apparatus of claim 8, wherein:
   the stopper is provided with a plurality of through holes through which the test probes are configured to pass respectively.

10. The target material thickness measuring apparatus of claim 2, wherein:
    the first end of the test probe is provided with a roller, such that the test probe is smoothly movable on the surface of the target material.

11. The target material thickness measuring apparatus of claim 7, wherein:
    the measurement value collection unit is fixed on a bracket extending from the support.

12. The target material thickness measuring apparatus of claim 2, further comprising:
    a guiding device adapted for guiding the support to move in a third direction perpendicular to the first direction and the second direction.

13. The target material thickness measuring apparatus of claim 12, further comprising:
    a bearing plate on which the target material is mounted; and
    the guiding device comprises a rail provided on the bearing plate and a slide assembly connected to the support and being movable on the rail.

14. The target material thickness measuring apparatus of claim 7, wherein:
    the image acquisition device is adapted for acquiring images of the graduations of the scale plate; and
    the image processing unit is adapted for processing the acquired images of the graduations of the scale plate so as to obtain position data of the graduations of the scale plate as a reference of measurement.

15. The target material thickness measuring apparatus of claim 3, further comprising:
a measurement value collection unit adapted for collecting measurement values at the plurality of positions, measured by the plurality of distance measuring units.

16. The target material thickness measuring apparatus of claim 4, further comprising:
a measurement value collection unit adapted for collecting measurement values at the plurality of positions, measured by the plurality of distance measuring units.

17. The target material thickness measuring apparatus of claim 15, wherein:
the measurement value collection unit comprises an image acquisition device adapted for acquiring images of the second ends of the plurality of test probes; and the target material thickness measuring apparatus further comprises a processing unit adapted for processing the images acquired by the image acquisition device to obtain positions of the second ends of the plurality of test probes, so as to obtain the thickness of the target material.

18. The target material thickness measuring apparatus of claim 3, further comprising:
a guiding device adapted for guiding the support to move in a third direction perpendicular to the first direction and the second direction.

19. The target material thickness measuring apparatus of claim 4, further comprising:
a guiding device adapted for guiding the support to move in a third direction perpendicular to the first direction and the second direction.

* * * * *